July 23, 1940.  L. J. CAMPBELL  2,208,747
CLUTCH MECHANISM
Filed June 2, 1938   2 Sheets-Sheet 1

INVENTOR.
LEON J. CAMPBELL
BY Eugene Conroy
ATTORNEY

July 23, 1940.　　　　L. J. CAMPBELL　　　　2,208,747
CLUTCH MECHANISM
Filed June 2, 1938　　　　2 Sheets-Sheet 2

INVENTOR.
LEON J. CAMPBELL
BY
ATTORNEY

Patented July 23, 1940

2,208,747

UNITED STATES PATENT OFFICE 2,208,747

CLUTCH MECHANISM

Leon J. Campbell, Chicago, Ill., assignor to Campbell-Buchanan Corporation, Chicago Ill., a corporation of Illinois Application June 2, 1938, Serial No. 211,406

15 Claims. (Cl. 192—53)

This invention relates to clutch mechanisms and more particularly to synchronizing clutches for automotive change speed transmissions.

The invention has particular reference to the type of clutch mechanism shown, described and claimed in my co-pending application Serial No. 166,260, filed September 29, 1937, now Patent No. 2,144,674 granted January 24, 1939.

In the clutch construction to which my invention relates, the clutching means which is interposed between the frictional clutch surfaces of the cooperating frictional clutch members is clamped between said clutch surfaces when connecting the clutch members and out of clamping relation with respect to said clutch surfaces when disconnecting them. The principal object of my present invention is to interconnect said clutching means with one of the clutch members so that the clutching means will be rotated positively with said clutch member to limit the turning effect on the clutching means to the other clutch member and thus facilitate the clutching action in the clamping of the clutching means between the clutch members.

A further object of the invention is to interconnect the carrier with the clutch member, when a carrier is used, with the clutching means or interconnect the clutching means directly with the clutch member when the clutching means is in the form of individual blocks or equivalent elements spaced about the clutch members in the space between them.

A further object of the invention is to provide the blocks or equivalent elements and the clutch member to which they are connected with interengaging parts so as to simplify the connection and provide a strong and durable clutch device.

A further object of the invention is to provide the interengaging connection between the blocks and the clutch member in the form of slots or recesses in the clutch member and either interfit the blocks in said slots or receses or provide lugs or like parts on the blocks to extend into said slots.

A further object of the invention is to provide a guide means for the blocks parallel with the inclined clutch surface of the clutch member with which the blocks are interconnected.

A further object of the invention is to have the spring means which urge the blocks forwardly or toward the shiftable clutch member directly engage or act on the blocks and be individual thereto when the blocks are employed in the clutch device without a carrier.

Other and further objects of my invention will appear from the following specification taken in conjunction with the accompanying drawings, in which—

Fig. 1 is a longitudinal half sectional view of a clutch mechanism embodying one form of my invention;

Figs. 2 and 3 are transverse sectional views taken on lines 2—2 and 3—3, respectively, of Fig. 1;

Figure 1:
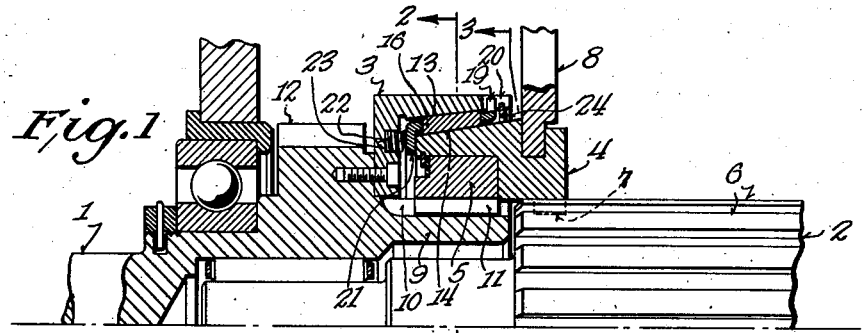

The clutch assembly shown in Fig. 1 provides for the selective connection of the alined driving and driven shafts 1, 2 of the transmission, first through the frictional clutch unit for synchronization and then through the positive clutch unit for direct drive as in my co-pending application. The shaft 1 leads from the master clutch (not shown) of the vehicle and extends into the transmission case where it has a hollow end to receive and support the adjacent end of the shaft 2 as shown. The frictional clutch unit comprises a pair of frictional clutch members 3, 4 on the respective shafts, while the positive clutch unit comprises the opposed splined portions of said shafts and the cooperating ring-like clutch member 5 shiftable with the frictional clutch member 4. These units are operable in sequence, the frictional clutch unit being engaged first to synchronize the shafts and the positive clutch unit being engaged following the release of the frictional clutch unit so that the shafts may be positively connected while they are rotating in unison.

In the embodiment shown, the frictional clutch member 3 is fixed to the shaft 1, while the frictional clutch member 4 is shiftable on the shaft 2, there being a splined connection 6, 7 between them as shown in Fig. 1. This enables the clutch member 4 to be shifted toward and from the clutch member 3 to close and open the frictional clutch unit. The member 4 is shifted through a yoke 8 which engages in an annular groove in said member, the yoke being connected with one of the shift rods in the transmission case as in devices of this general character.

The positive clutch member 5 is rotatably carried by the member 4 in a chamber therein and is movable with said member 4 in and out of bridging relation with respect to the opposed ends of the shafts 1 and 2. For this purpose the hollow end portion 9 of the shaft 1 has the same diameter as the splined portion of the shaft 2 and is provided with similar splines 10, the latter being engaged by internal splines 11 within the member 5. The clutch member 3 may be fixed to the shaft 1 at its gear 12 with which the shaft is provided just inside of the front wall of the transmission box. This gear is a part of the gear train located in the box as in devices of this character. The gear 12 may be made integral with the shaft 1 and the clutch member 3 may be secured to said gear by screws as shown.

The clutch members 3, 4 are of the interfitting cone-type having inclined clutch surfaces 13, 14, respectively. These clutch surfaces, as set forth in my co-pending application and as shown herein, are arranged at different angles to the axis of the shafts 1, 2 with their apices on the same side of the clutch members. The surface 13 on the outer clutch member 3 is at a lesser angle than the surface 14 on the inner clutch member 4. In the embodiment shown, the angularity of these surfaces is approximately 5 and 7 degrees, respectively. This provides a driving surface for the clutch at the lesser angle and a quick release for the clutch at the greater angle. This feature is claimed in my said co-pending application.

The clutch surfaces 13 and 14 are radially spaced and arranged between them is the interposed clutching means of my present invention. Several forms of this means are shown herein, the first form being illustrated in Figs. 1 to 3.

Figures 2, 3:
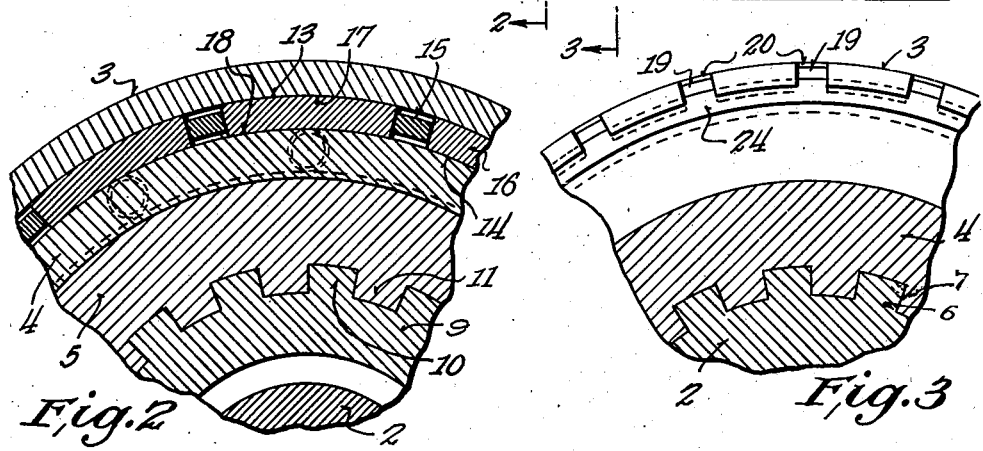

As shown in Figs. 1 to 3, the clutch means referred to comprises an annular carrier 15 apertured to accommodate a complement of friction clutch blocks 16, 16. The latter are thicker than the carrier (see Fig. 2) so that the blocks may engage the clutch surfaces 13, 14 of the clutch members 3 and 4. The blocks are clamped between these clutch surfaces on closing the frictional clutch and each block has its outer and inner surfaces 17 and 18 inclined complementary to the associated clutch surfaces 13 and 14.

The carrier 15 is interlocked with one of the clutch members, namely, the outer one 3 in the embodiment shown so as to positively rotate the blocks or equivalent means with said clutch member. The interconnection shown comprises teeth 19 on the carrier and notches 20 for said teeth in the clutch member 3. As shown in Figs. 1 and 3, the teeth 19 and the notches 20 are at the outer peripherial edges of the carrier and the clutch member, respectively. The notches 20 open outwardly through the outer edge of the clutch member so that the parts may be readily assembled and disassembled. The notches and the teeth are circumferentially disposed about the clutch unit to provide an effective interlock completely about the same.

The inner margin of the carrier 15 provides a flange formation 21 which flange extends radially inward into the path of the inner end of the shiftable clutch member 4. This assures proper setting of the clutch blocks as the latter are forced against the clutch surfaces 13, 14 to connect the clutch members. Spring means 22 presses against the flange 21 in opposition to the member 4 to assure an effective release for the blocks as the clutch unit is de-clutched. The spring means in the embodiment shown consists of individual coiled springs disposed about the carrier and carried by the clutch member 3 in recesses 23 in its radial wall opposite the flange 21.

It will be noted that the teeth 19 and the flange 21 extend radially in opposite directions. The teeth extend outwardly or away from the axis of the shafts to engage the teeth 20, while the flange 21 extends inwardly or toward the axis of the shafts to be engaged by the springs and also by the inner end of the shiftable clutch member 4. The notches 20 have length sufficient to allow for the necessary axial movement of the carrier to set the blocks between the clutch members as the blocks are clamped therebetween. A stop ring 24, shown in Fig. 1, keeps the springs 22 from forcing the carrier 15 out of its interconnected relation with the clutch member 3.

Figures 4, 5:
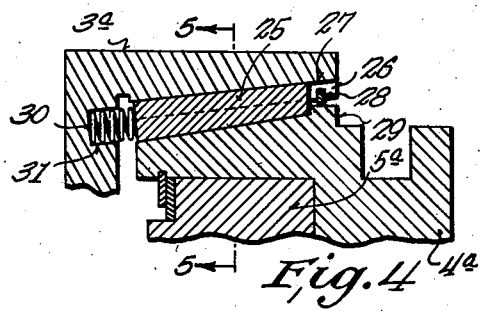
Fig. 4 is a fragmentary longitudinal sectional view showing another form of my invention.
Fig. 5 is a sectional view taken on line 5—5 of Fig. 4.

In the form shown in Figs. 4 and 5, the blocks 25 are carried directly by the outer clutch member 3a in under-cut grooves 26 in its inner annular surface. These grooves have their bottom walls 27 inclined at the degree required for the driving surface of the clutch device. In short, the bottom walls 27 correspond to the inclined surface 13 of the outer clutch member 3 in the construction shown in Figs. 1 to 3. The grooves 26 open through the outer peripheral edge of the clutch member 3a so that the blocks 25 may be inserted into the grooves.

A stop ring 28 keeps the blocks from sliding endwise out of the grooves. This ring fits in a channelway provided in the clutch member 3a adjacent its outer edge and does not extend radially inwardly far enough to interfere with the movement of an abutment or shoulder 29 on the shiftable clutch member 4a in the opening and closing of the clutch. This shoulder is forced against the blocks to move them inwardly as the clutch is closed. Spring means 30 acts against the inner ends of the blocks in opposition to the shoulder. This spring means also consists of individual coiled springs, one for each block, and seated in recesses 31 in the radial or back wall of the clutch member 3a.

The outer surfaces 32 of the blocks 25 are inclined complementary to the inclined bottom walls 27 of the grooves, while the inner surfaces 33 of the blocks are inclined complementary to the inclined surface 14a of the clutch member 4a. In Figs. 4 and 5, the positive clutch member is shown at 5a.

Figures 6, 7, 8:
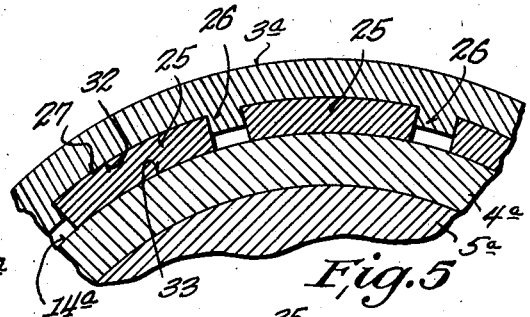
Fig. 6 is a fragmentary longitudinal sectional view with parts in elevation showing another form of my invention, namely, wherein the individual blocks or equivalent elements are directly interconnected with one of the clutch members.
Fig. 7 is a sectional view taken on line 7—7 of Fig. 6.
Fig. 8 is a plan view of the parts shown in Fig. 6.

The blocks 34 in the form shown in Figs. 6 to 8 are also carried by the outer clutch member 3b. These blocks co-act directly with the inclined clutch surface 13a of said outer clutch member. The clutch surface 13a is at the lesser angle as in Fig. 1.

The blocks 34 are interlocked with the clutch member 3b by the use of lugs 35 on the blocks extending outwardly through slots 36 in the overhanging wall 37 of the clutch member 3b. The lugs project beyond this wall and are held in place by cotter-pins or equivalent means 38. These fastenings are inserted through apertures in the lugs, each block having a single lug in the embodiment shown.

The blocks 34 have a limited radial movement, the lugs and the slots providing a slidable connection. The lugs and the slots are shaped to hold the blocks against turning, a rectangular shape being shown in the drawings. The slots are enlarged axially of the assembly so that the blocks may move within limits in that direction.

Springs 39 urge the blocks forwardly and the shiftable clutch member 4b has a shoulder 40 to engage the blocks in the closing of the clutch as shown in Fig. 6. The springs 39 are seated in recesses 41 in the back wall of the clutch member as shown.

The inner and outer surfaces 42, 43 of the blocks co-act with the inclined clutch surfaces 13a, 14a of the clutch members 3b and 4b and are complementary therein having the differential angle arrangement shown in the previously described forms.

Figure 9:
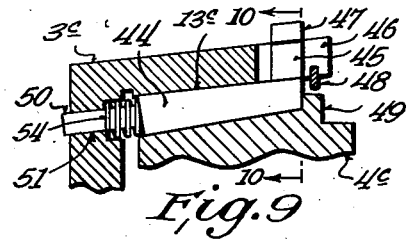
Fig. 9 is a longitudinal sectional view showing another form of interconnection between a block and the clutch member to which the block is connected.
Figure 10:
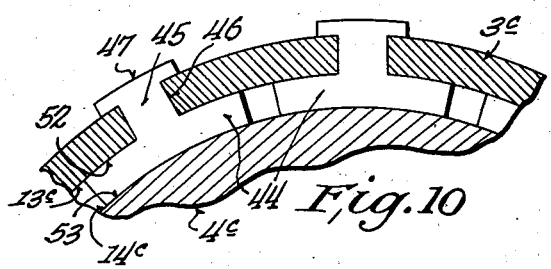
Fig. 10 is a sectional view taken on line 10—10 of Fig. 9.
Figure 11:
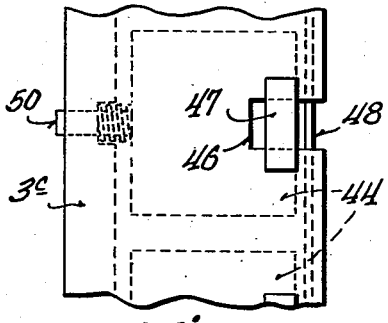
Fig. 11 is a plan view of the parts shown in Fig. 9.

In Figs. 9, 10 and 11, the blocks 44 are carried by the outer clutch member 3c, the interlocking connection comprising a lug 45 at the outer edge of each block and extending through a slot 46 in the outer edge of the clutch member 3c. The slots open through the clutch member so that the parts may be assembled, the lugs each having a crossing portion 47 at its outer end to span the slot and hold the block in place in the clutch device. A ring 48 keeps the blocks in place and clears a shoulder 49 on the shiftable clutch member 4c as in Figs. 4 and 6.

The slots 46 are long enough to allow for a limited movement of the blocks axially of the clutch in the opening and closing thereof. This is shown in Fig. 11. The blocks have guide pins 50 at their inner ends, said pins being individual to the respective blocks and extending through apertures 51 in the back wall of the clutch member 3c. The pins and apertures 50, 51 are set at the same angle as the incline of the clutch surface 13c of the clutch member 3c. The outer surfaces 52 of the blocks are inclined complementary to the opposed surface 13c, while the inner surfaces 53 of the blocks are inclined complementary to the inclined surface 14c of the clutch member 4c. Spring means 54 is associated with the blocks 44 at the pins 50 to normally urge the blocks forwardly, and each block may be cast or blanked into the shape shown.

Figure 13:
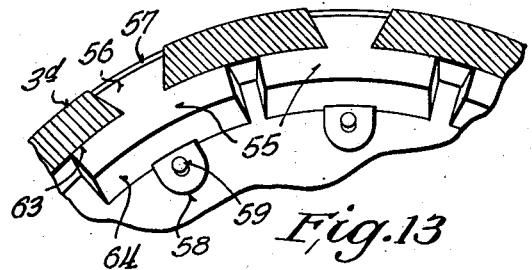
Fig. 13 is a sectional view taken on line 13—13 of Fig. 12.
Figure 12:
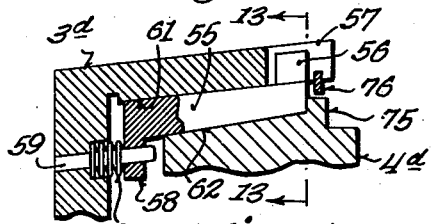
Fig. 12 is a sectional view similar to that of Fig. 9, showing a different form of interconnection between the blocks and the clutch member.

In the form shown in Figs. 12 and 13, the blocks 55 are interlocked with the outer clutch member 3d by lugs 56 at their outer ends fitting in notches 57 in the outer edge of the clutch member 3d. The lugs and notches are preferably dove-tailed in shape to hold the blocks on the clutch member.

Each block 55 has a projection 58 at its inner end to accommodate a guide pin 59 carried by the back wall of the clutch member 3d. Each pin 59 mounts a coiled spring 60 for the associated block. The pins are arranged parallel to the inclined clutch surface 61 of the clutch member 3d. The clutch member 4d has an opposed clutch surface 62 inclined at a divergent angle as in Fig. 1. The clutch surfaces 63, 64 of the blocks are complementary to the co-acting clutch surfaces with respect to which the blocks are interposed.

Figure 14:
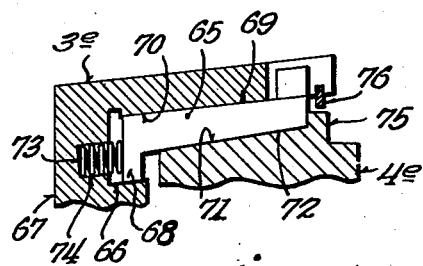
Fig. 14 is a section like Fig. 12 showing a different form of guide for the block.

In Fig. 14, the clutch blocks 65 (only one being shown) are mounted between the clutch members 3e, 4e in the same manner as the clutch blocks in Fig. 12, except as to the guides at the inner ends of the blocks. These guides, as indicated in Fig. 14, comprise shoulders 66 on the back wall 67 of the clutch member 3e, one for each block. The latter has a lug 68 to rest on the shoulder. The guiding surface of the shoulder is parallel to the inclined surface 69 of the clutch member 3e. The block 65 has a complementary inclined surface 70. Its inner surface 71 is complementary to the inclined surface 72 on the clutch member 4e. These inclined surfaces are at different angles as shown.

The blocks 65 are pressed forwardly by springs 73, seated in recesses 74 in the clutch wall 67. The clutch members 4d and 4e are each provided with a shoulder 75 to center the blocks on closing the friction clutch. 76 indicates a holding ring for the blocks in both forms, that is, Figs. 12 and 14.

Figure 15:
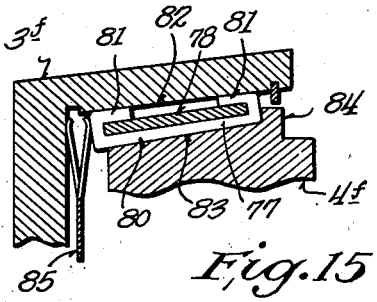
Fig. 15 is a longitudinal sectional view showing an improved block and band arrangement to be later described.
Figure 16:
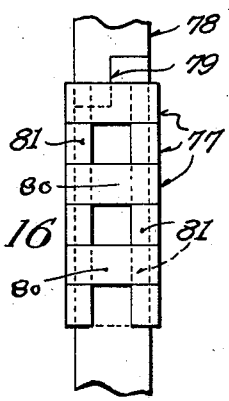
Fig. 16 is a fragmentary top plan view of the block and band assembly of Fig. 15.

In Figs. 15 and 16, the blocks 77 are mounted on a carrier ring or band 78, which in the embodiment shown has a stepped joint 79 at one point in its circumference. The blocks 77 may completely encompass the band or they may partially enclose it in which case they will have body portions 80 and opposed end portions 81, 81. The latter overlap the band on one face and hold the blocks on the band with the body portions overlapping the opposite face of the band. The end portions 81 also enclose the side edges of the band. The blocks 77 are preferably threaded on the band when its ends are apart, after which the ends are interlocked and held together by the blocks which overlap the joint in the band. This assembly fits in the space between the inclined clutch surfaces 82, 83 of the clutch members 3f, 4f, the latter having a shoulder 84 to center the blocks on closing the clutch. A spring device 85 is employed at the inner ends of the blocks to urge the carrier and its blocks forwardly. The outer and inner surfaces of the blocks are inclined complementary to the clutch surfaces 82, 83 respectively.

The blocks 77 are preferably arranged on the carrier band to have their body portions 80 alternate on opposite sides of the band as shown in Fig. 16. This distributes the full friction surfaces of the blocks between the two clutch members.

The structures shown and described provide a durable and effective clutch construction. The blocks or equivalent elements by reason of their individual arrangement provide edges to break down the oil film on the clutch surface or surfaces which have relative rotation with respect to the blocks and thus condition the engaged surfaces to take the load and engage the clutch means in the clutching of the device.

With the blocks rotatable positively with one of the clutch members as in the forms shown in Figs. 1 to 14 inclusive, the turning effect on the blocks in the action of the clutch device is limited to the other clutch member. One important advantage of this is the fact that the blocks always co-act with the same portions of the frictional clutch surface of the clutch member with respect to which the blocks are interconnected and hence the blocks are subject to less wear and, moreover, need only break down the oil film on the clutch surface of the clutch member which has rotative movement in regards to the blocks. Another advantage of the construction is that the slippage is limited to the last named clutch member and the clutch members are easier to connect as the blocks are clamped between the clutch members. The power or force in clamping the blocks between the clutch members is from the clutch surface of the lesser angle. With the blocks interlocked with said clutch member the tightening action takes place early in forcing the shiftable clutch member against the blocks as there is no slippage allowed between the blocks and the clutch surface of the lesser angle. The quick release as afforded by the clutch surface of the greater angle is still retained as said clutch member is still shiftable away from the blocks.

I claim as my invention:

1. In a clutch mechanism, a pair of relatively axially shiftable clutch members having radially spaced inclined frictional clutch surfaces at different angles to the axis of rotation of said clutch members, clutching means interposed between and engageable with said clutch surfaces and having clutch faces complementary thereto, said clutching means being clamped between said clutch surfaces in the relative axial shifting of the clutch members towards each other to connect the clutch members, shifting means for the clutch members, and means interconnecting the clutching means to one of the clutch members for positive rotation therewith.

2. In a clutch mechanism, a pair of relatively shiftable clutch members having radially spaced inclined frictional clutch surfaces, clutching elements interposed between and engageable with said clutch surfaces and having clutch faces complementary thereto, said elements being clamped between said clutch surfaces when connecting the clutch members, a carrier for said elements, and means interconnecting the carrier with one of the clutch members for positive rotation therewith.

3. In a clutch mechanism, a pair of relatively shiftable clutch members having radially spaced inclined frictional clutch surfaces, clutching elements interposed between and engageable with said clutch surfaces and having clutch faces complementary thereto, said elements being clamped between said clutch surfaces when connecting the clutch members, a carrier for said elements, and interengaging teeth and notches connecting the carrier to one of the clutch members for positive rotation therewith.

4. In a clutch mechanism, a pair of relatively shiftable inner and outer clutch members having radially spaced inclined frictional clutch surfaces, clutching elements interposed between and engageable with said clutch surfaces and having clutch faces complementary thereto, said elements being clamped between said clutch surfaces when connecting the clutch members, and a carrier for said elements, said carrier having tooth-like projections at one edge extending into notches in the adjacent edge of the outer clutch member for interconnecting the carrier thereto.

5. In a clutch mechanism, a pair of relatively shiftable inner and outer clutch members having radially spaced inclined frictional clutch surfaces, clutching elements interposed between and engageable with said clutch surfaces and having clutch faces complementary thereto, said elements being clamped between said clutch surfaces when connecting the clutch members, and a carrier for said elements, said carrier having an interlocking connection at its outer edge with the outer clutch member for positive rotation therewith, said carrier having a flange formation at its inner edge for engagement by the inner clutch member in the relative shifting of the clutch members into clutching relation.

6. In a clutch mechanism, a pair of relatively shiftable clutch members having radially spaced inclined frictional clutch surfaces about the axis of rotation of the members, clutching elements interposed between and engageable with said clutch surfaces and having clutch faces complementary thereto, said elements being clamped between said clutch surfaces when connecting the clutch members and disposed in circumferential relation about the same, an abutment on one of the clutch members for direct contact with the elements in the relative shifting of the clutch members into clutching relation, and resilient means acting directly on the elements in opposition to said abutment.

7. In a clutch mechanism, a pair of relatively shiftable clutch members having radially spaced inclined frictional clutch surfaces about the axis of rotation of the members, clutching elements interposed between and engageable with said clutch surfaces and having clutch faces complementary thereto, said elements being clamped between said clutch surfaces when connecting the clutch members and disposed in circumferential relation about the same, an abutment on one of said clutch members for direct contact with said elements in the relative shifting of the clutch members into clutching relation, and resilient means, one for each of the elements and having direct action thereon in opposition to said abutment.

8. In a clutch mechanism, a pair of relatively axially shiftable clutch members having radially spaced inclined frictional clutch surfaces at different angles to the axis of rotation of said clutch members, clutching elements interposed between and engageable with said clutch surfaces and having clutch faces complementary thereto, said elements being clamped between said clutch surfaces in the relative axial shifting of the clutch members towards each other to connect the clutch members, and shifting means for the clutch members, means interconnecting the elements directly with one of the clutch members for positive rotation therewith.

9. In a clutch mechanism, a pair of relatively shiftable clutch members adapted for rotation about a common axis, said clutch members having opposed inclined frictional clutch surfaces at different angles to said axis and disposed with their apices on the same side of the clutch members, the clutch surfaces on one clutch member constituting the bottoms of circumferentially spaced grooves in said member, and clutching elements interposed between the clutch members and engageable with the inclined clutch surfaces thereof for connecting the clutch members when the elements are clamped between them, said elements extending into said grooves and having an interfitting connection therewith.

10. In a clutch mechanism, a pair of relatively shiftable clutch members adapted for rotation about a common axis, said clutch members having radially spaced inclined frictional clutch surfaces at different angles to said axis and disposed with their apices on the same side of the clutch members, and clutching elements interposed between and engageable with said clutch surfaces, said elements being clamped between said clutch surfaces when connecting the clutch members and having clutch faces complementary to those of the clutch members, said elements having lugs extending into and interconnected with respect to apertures in one of said clutch members.

11. In a clutch mechanism, a pair of relatively axially shiftable clutch members having radially spaced inclined frictional clutch surfaces, individual circumferentially disposed blocks interposed between and engageable with said clutch surfaces, said blocks being clamped between said clutch surfaces in the relative axial shifting of the clutch members towards each other to connect the clutch members and having clutch faces complementary to those of the clutch members, lugs on the blocks extending into and through apertures in one of the clutch members, means engaging the lugs for holding the blocks in connected relation with said last named clutch member, and shifting means for the clutch members.

12. In a clutch mechanism, a pair of relatively shiftable clutch members having radially spaced inclined frictional clutch surfaces, clutching elements interposed between and engageable with said clutch surfaces, said elements being clamped between said clutch surfaces when connecting the clutch members and having clutch faces complementary to those of the clutch members, and substantially radial lugs at the outer ends of the elements and extending into substantially radial notches in the adjacent edge of one of the clutch members for connecting the elements to said clutch member.

13. In a clutch mechanism, a pair of relatively shiftable clutch members having radially spaced inclined frictional clutch surfaces, blocks interposed between and engageable with said clutch surfaces, said blocks being clamped between said clutch surfaces when connecting the clutch members and having clutch faces complementary to those of the clutch members, lugs at the outer ends of the blocks extending into slots in the adjacent edge of one of said clutch members, said lugs and slots having a dove-tailed formation for interconnecting the blocks to said clutch member.

14. In a clutch mechanism, a pair of relatively shiftable clutch members having radially spaced inclined frictional clutch surfaces at different angles to the axis of rotation of said members, clutching means interposed between and engageable with said clutch surfaces and having clutch faces complementary thereto, said clutching means being clamped between said clutch surfaces in the relative shifting of the clutch members towards each other to connect the clutch members, means interconnecting the clutching means with one of the clutch members to limit the rotative slippage of the clutching means with respect to the last named clutch member, and shifting means for the clutch members.

15. In a clutch mechanism, a pair of relatively shiftable inner and outer clutch members having radially spaced inclined frictional clutch surfaces at different angles to the axis of rotation of said members, clutching means interposed between and engageable with said clutch surfaces and having clutch faces complementary thereto, said clutching means being clamped between said clutch surfaces in the relative shifting of the clutch members toward each other to connect the clutch members, means interconnecting said clutching means to the clutch member having the clutch surface of the lesser angle to confine the rotative slippage with respect to the clutching means to the clutch member having the clutch surface of the greater angle, and shifting means for the clutch members.

LEON J. CAMPBELL.